United States Patent [19]

Schmidt

[11] 4,385,650
[45] May 31, 1983

[54] FEED ROLL WITH SPIKES

[75] Inventor: Phillip A. Schmidt, Federal Way, Wash.

[73] Assignee: Weyerhaeuser Company, Tacoma, Wash.

[21] Appl. No.: 252,970

[22] Filed: Apr. 10, 1981

[51] Int. Cl.³ ............................................. B27B 31/00
[52] U.S. Cl. ............................ 144/246 C; 144/246 F; 198/692
[58] Field of Search ........................ 198/688, 692, 698; 144/208 E, 208 R, 2 Z, 246 R, 246 A, 246 C, 246 E, 208 F, 343, 340

[56] References Cited

U.S. PATENT DOCUMENTS 4,057,192 11/1977 Smith ............................... 144/246 F

FOREIGN PATENT DOCUMENTS 33015 3/1911 Sweden ........................... 144/246 C

OTHER PUBLICATIONS

Studies of Damage Done to Timber by Delimbing-Slashing Machines Provided with Different Types of Feed Rollers by Bo Magnusson, May 1978, p. 50.
Dubbens Utformning Augör Matningskraften by Richard Uusijärvi.

Primary Examiner—W. D. Bray
Attorney, Agent, or Firm—Weyerhaeuser Company

[57] ABSTRACT

An improved feed roll for logs and the like has a plurality of radially extending trapezoidally shaped pyramids spaced circumferentially about the surface. In adjacent rows an offset may be provided and certain dimensional relationships are provided to yield increased traction with a reduction in tree surface damage.

4 Claims, 7 Drawing Figures

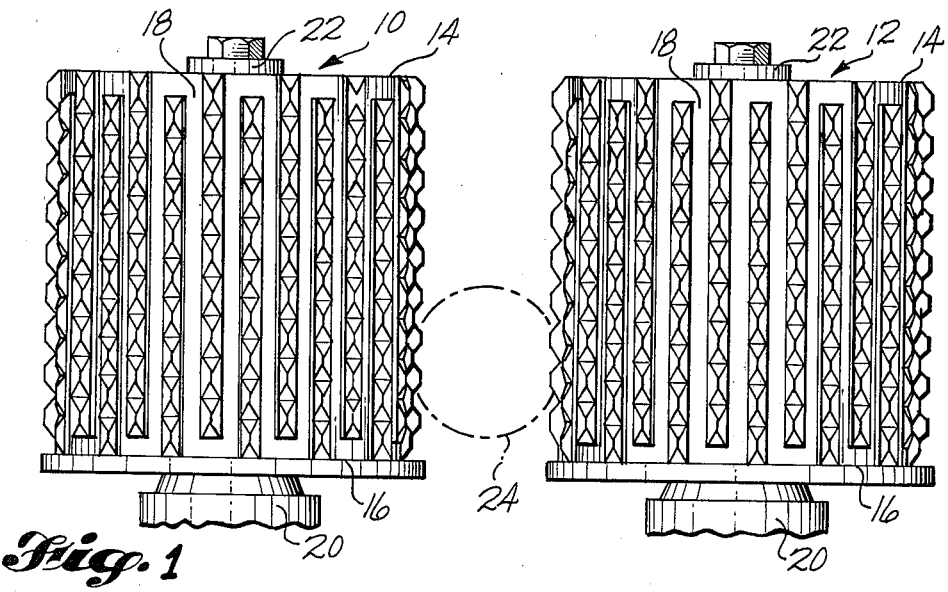
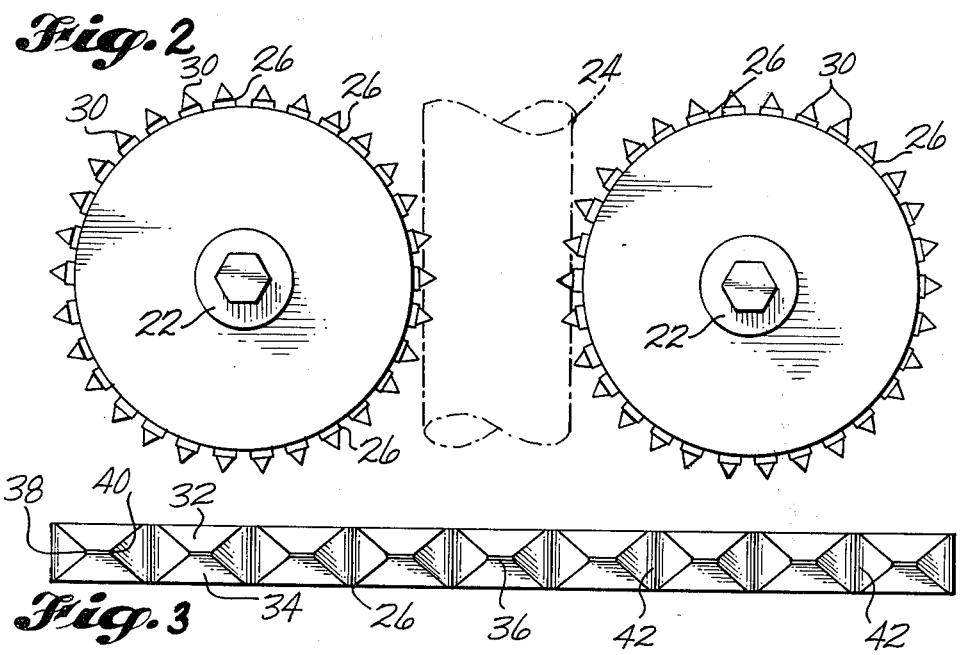

ically cylindrical feed rolls 10 and 12. One side 46 of base members 28 is perpendicular while the other side 48 is inclined as shown to aid in maintenance and fabrication. Inclined side 48 also provides additional material to strengthen the trapezoidal pyramid 30.

FEED ROLL WITH SPIKES

BACKGROUND AND BRIEF SUMMARY OF THE INVENTION

This invention relates generally to feed rolls for logs or other similar elongated objects. More particularly it relates to an improved feed roll having upstanding "spikes" affixed to the generally cylindrical surface.

Feed rolls for logs are used in various log handling applications such as feeding unbarked logs through a debarker, feeding logs through a sawing machine, and for feeding trees through a delimber. Each of these exemplary applications has different requirements with respect to the feed characteristics of the log and of the feed rolls. Two basic requirements are that the feed rolls provide sufficient motive force to carry the logs through the processing station and that they be transported through the rolls without undue damage to the log or tree.

One of the applications requiring a significant motive force in view of the reaction forces created by the process is the delimber. In order to provide the motive force traction must be developed between the feed roll and the log surface. Typically spikes extending radially outwardly from the surface of the feed roll would act to clutch the log surface and motivate it. With significant reaction forces created by the delimber knives, the spikes are required to penetrate the surface of the log causing damage. Such damage reduces the value of the log based upon the fact that fewer and/or lower value products are produced. As the logs become generally smaller in diameter, the problem of surface damage becomes even more significant.

In a typical delimbing application a pair of spiked feed rolls will act in unison to pull a log through a set of delimbing knives. Each roll can be driven by a gear and pinion arrangement that is housed in a case which pivots about the pinion shaft. This structure, as will be well understood by those skilled in the art, allows the rolls to move laterally to adjust to the tree diameter. A suitable cross linkage provides simultaneous lateral motion and a hydraulic cylinder provides the opening and closing action allowing the rolls to continuously follow the surface of the tree. To develop the necessary traction the spikes will penetrate the surface.

The significant forces involved in the delimbing application are the feed force acting parallel to the tree and a normal force forcing the feed roll spikes into the surface to generate the traction necessary to transmit the feed force. The normal force has several components. These forces acting through the spikes develop the required traction to overcome the reaction force from the knives and bring the trees through the knives at an adequate production rate.

In the past the typical spike configuration used has been conical. Rows of conical spikes are spaced about the circumference of the roll and are siged and spaced to provide the best available feeding characteristics with the least amount of damage. Another typical configuration is the saw tooth where circumferentially spaced rows of saw tooth bars are afixed to the roll surface.

It has been found that the typical conically spiked roll could be improved and that certain configurations afford improved traction with less wood damage. Not only does the improvement afford better traction and less damage, but it also is of simple construction and lends itself to easy maintenance.

Briefly, the present invention is practiced in one form by a feed roll having a plurality of trapenzoidally shaped pyramids spaced about the circumference of the roll. In adjacent rows of trapezoidal pyramids an offset is maintained. Certain dimensional characteristics are provided to yield the increased traction with reduced damage.

BRIEF DESCRIPTION OF THE DRAWINGS

FIG. 1 is an end view showing a roll pair with the improved surfaces and a log therebetween.

FIG. 2 is a top view showing the improved rolls and a log therebetween.

FIG. 3 is a top plan view showing a plurality of trapezoidal pyramids uniformly spaced along a bar.

FIG. 4 is a front view showing the trapezoidal pyramid bar.

DESCRIPTION OF THE PREFERRED EMBODIMENT

Figure 5:
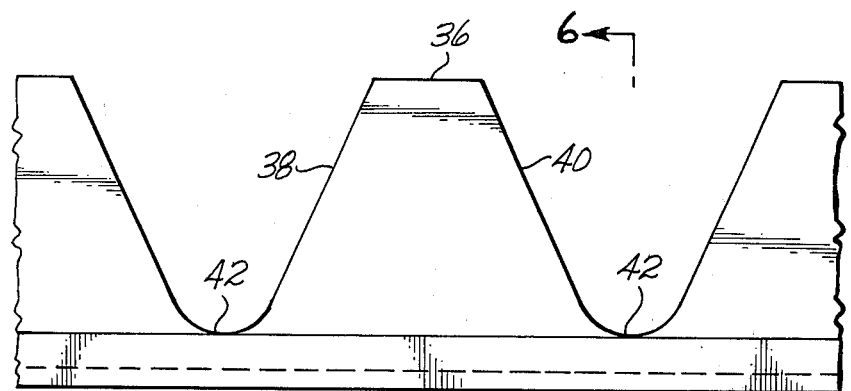
FIG. 5 is a detail view showing an individual trapezoidal pyramid.

Referring first to FIGS. 1 and 2 a pair of feed rolls is depicted being designated as 10, 12 respectively. Each is cylindrical and has top and bottom ends 14, 16 respectively and surface 18. As an example only, representative dimensions for a delimber application will be a length of approximately 425 mm and a diameter of approximately 400 mm for each cylindrical portion of the feed roll assembly. Each roll can be mounted on a pivotal base 20 over an upstanding shaft assembly 22 for easy removal. The rolls will be rotatable via suitable drive means (not shown). As previously pointed out the rolls are moveable laterally in unison in order to contact two points on the surface of a log or tree 24. A suitable means is provided (not shown) to force the rolls into a tractive relationship with the log and when power is applied to rotate the rolls in opposite directions a tractive force will serve to feed the log through the roll pair.

Mounted on the surface 18 of each roll 10, 12 is a plurality of substantially uniformly spaced pyramid bars 26. Bars 26 are circumferentially spaced about surface 18 a distance apart equal to approximately 12° of arc and they are mounted so as to be substantially parallel to the axis of rotation.

Extending upwardly from a base member 18 on each bar 26 is a plurality of substantially uniformly spaced trapezoidal pyramids 30. It will be the front and rear surfaces 32 and 34 respectively that serve to actually impart the tractive force to the log after at least a portion of at least some of the trapezoidal pyramids penetrate the surface of a log to be moved. The tops 36 of pyramids 30 are like knife edges and do in fact penetrate some distance into the log depending upon the log and the force urging the roll pair together. See FIGS. 3 and 4 in particular. The two side faces 38, 40 respectively of each pyramid slope downwardly from tops 36 to base member 28 where between pyramids a curvilinear transition surface 42 is located.

Figure 6:
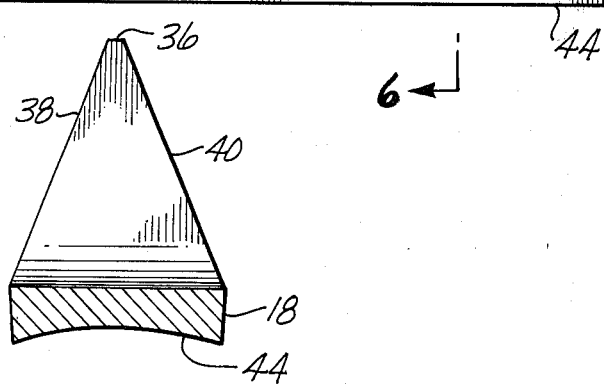
FIG. 6 is a view taken along line 6—6 of FIG. 5.
Figure 7:
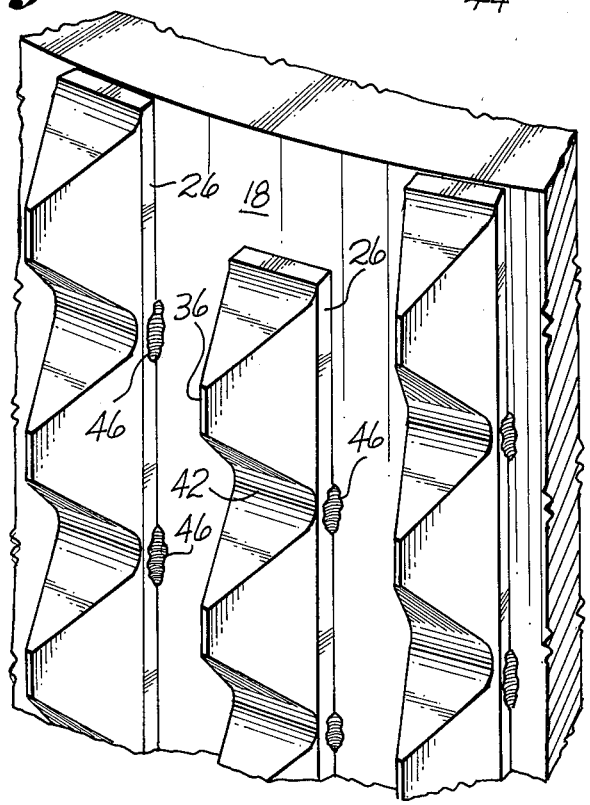
FIG. 7 is a perspective view of a portion of an improved feed roll depicting the bars afixed to the roll surface.

As can be seen in FIG. 6 the lowermost surface 44 on base members 28 can be contoured to match the curve on surface 18. Each bar 26 is afixed to surface 18 through any suitable means such as weldments 46. As may be best seen in FIG. 7 the pyramids 30 in each adjacent row will be offset so that the front and rear faces are not in line circumferentially in adjacent rows but they will be aligned in every other row. By offsetting the pyramids longer shear planes are generated and therefore enchance traction and reduce the possibility of "spinouts" on the log surface.

The dimensional characteristics important to the proper functioning with the intended results include certain ranges and ratios. The angle the front and rear surfaces 32, 34 form with a line perpendicular to surface 18 shall fall within a range of from 15°–25° with 22.5° being a preferred angle. The angle between two adjacent side faces should fall within a range of from 40°–60° with 50° being a preferred angle. The apex of these angles should meet at approximately a point close to the lowest surface on base member 28. For logs and trees the overall effective height (above level of surface 18) of each pyramid should fall within a range of from 25–40 mm with 33 mm being a preferred height. The preferred ratios are as follows for the trapezoidal front and rear surfaces: base equals 1.3 times the height and top equals 0.4 times the height. The base to height ratio can fall within a range of from 1.1–1.5 and the top dimension to height dimension may fall within a range of from 0.25–0.55.

The circumferential width of each pyramid at the base falls within a range of from 18–30 mm although 24 mm is the preferred dimension and provides a reasonable amount of structural support.

With the above outlined dimensions of the columnar stiffness and shear plane area are approximately balanced when the pyramids are offset as previously mentioned.

While a detailed description of the preferred embodiment has been disclosed it may occur to those skilled in the art to make modifications that still fall within the broad scope of the invention. All such modifications are intended to be included within the scope of the appended claims.

I claim:

1. A feedroll of the type comprised of a rotatable cylinder having a surface and the improvement comprising:
   a plurality of trapezoidal pyramids extending upwardly from the surface and being substantially uniformly spaced thereover, and
   each of the pyramids having a height falling within a range of from 25 mm–40 mm, a base to height ratio falling within a range of from 1.1–1.5, a top to height ratio falling within a range of from 0.25–0.55, and an angle of the inclined front and rear faces falling within a range of from 15°–30°.

2. A feedroll as in claim 1 in which the trapezoidal pyramids are uniformly spaced apart in rows and with the included angle between adjacent side faces falling within a range of from 40°–60°.

3. A feedroll as in claim 2 in which the trapezoidal pyramids in a row extend upwardly from a base member which is affixed to the surface of the feedroll cylinder.

4. A feedroll as in claim 2 in which the trapezoidal pyramids in adjacent rows are uniformly offset from one another.

* * * * *